(12) United States Patent
Stewart

(10) Patent No.: US 8,446,643 B2
(45) Date of Patent: May 21, 2013

(54) METHOD AND APPARATUS FOR DETECTING A SIZE AND SHAPE OF MEDIA ON WHICH IMAGE DATA IS TO BE PRINTED IN AN IMAGE PRODUCTION DEVICE

(75) Inventor: David Shawn Stewart, Hertford (GB)

(73) Assignee: Xerox Corporation, Norwalk, CT (US)

( * ) Notice: Subject to any disclaimer, the term of this patent is extended or adjusted under 35 U.S.C. 154(b) by 612 days.

(21) Appl. No.: 12/711,301

(22) Filed: Feb. 24, 2010

(65) Prior Publication Data

US 2011/0205563 A1 Aug. 25, 2011

(51) Int. Cl.
*H04N 1/40* (2006.01)
(52) U.S. Cl.
USPC ............................................ 358/449; 358/468
(58) Field of Classification Search
USPC .................... 358/1.9, 2.1, 468, 1.2, 528, 449, 358/451, 400, 500
See application file for complete search history.

(56) References Cited

U.S. PATENT DOCUMENTS

| | | | |
|---|---|---|---|
| 5,091,754 A * | 2/1992 | Abe et al. ...................... | 399/394 |
| 5,959,290 A | 9/1999 | Schweid et al. | |
| 6,078,051 A | 6/2000 | Banton et al. | |
| 6,122,393 A | 9/2000 | Schweid et al. | |
| 6,198,835 B1 | 3/2001 | Banton et al. | |
| 6,246,781 B1 | 6/2001 | Schweid et al. | |
| 6,252,680 B1 | 6/2001 | Schweid et al. | |

FOREIGN PATENT DOCUMENTS

JP 2005062316 A * 3/2005

* cited by examiner

*Primary Examiner* — Thomas D Lee
*Assistant Examiner* — Stephen M Brinich
(74) *Attorney, Agent, or Firm* — Ronald E. Prass, Jr.; Prass LLP

(57) ABSTRACT

A method and apparatus for detecting a size and shape of media on which image data is to be printed in an image production device is disclosed. The method may include receiving a request to print a print job, scanning image data for the print job, feeding media on which the image data is to be printed, scanning the fed media to determine the size and shape of the fed media, generating a mask based on the determined size and shape of the fed media, applying the mask to the image data, the mask permitting marking material to be applied to an intermediate member based on the determined size and shape of the fed media, applying the image data to the fed media; and outputting the fed media containing the image data.

18 Claims, 5 Drawing Sheets

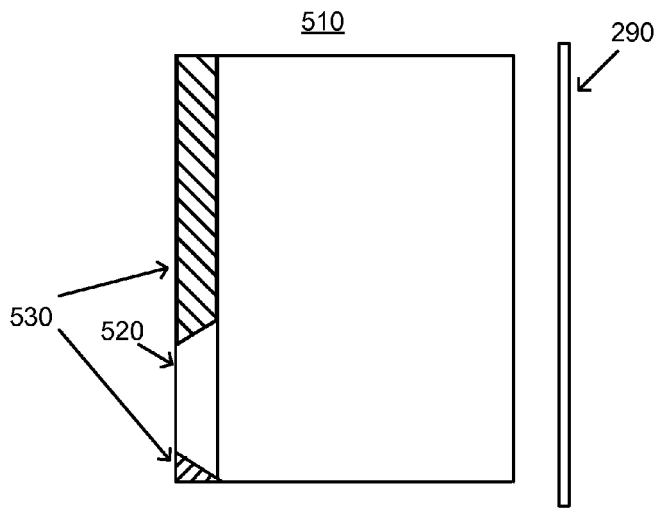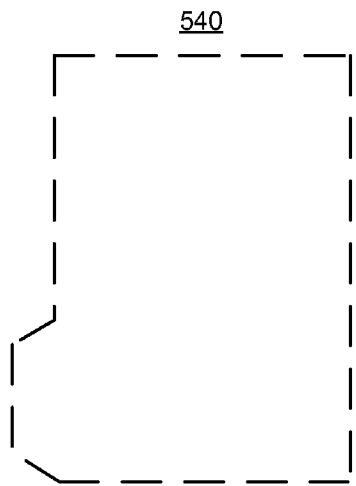
FIG. 5A  FIG. 5B
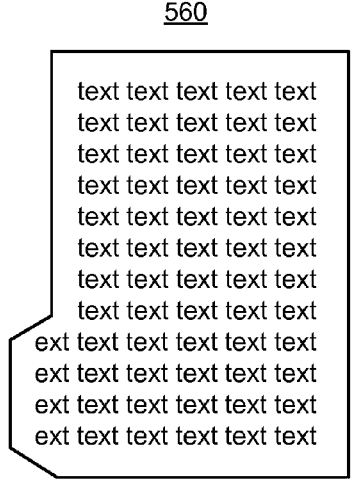
FIG. 5C  FIG. 5D

METHOD AND APPARATUS FOR DETECTING A SIZE AND SHAPE OF MEDIA ON WHICH IMAGE DATA IS TO BE PRINTED IN AN IMAGE PRODUCTION DEVICE

BACKGROUND

Disclosed herein is a method for detecting a size and shape of media on which image data is to be printed in an image production device, as well as corresponding apparatus and computer-readable medium.

Conventional image production devices handle a variety of output media, which are generally assumed by the device to be rectangular. However, some of the media have areas where a portion of the media is that is expected is not present, which are called exclusions. Media with exclusions may include tabbed media, hole-punched media, odd-shaped media, or odd-sized media, for example.

The exclusions on these media can lead to ink or toner being laid down on internal mechanisms that are not designed to handle excess ink or toner that was not attached to the media. These issues are usually handled by inhibiting the laying down of images in area where this issue could arise. This conventional approach reduces function, sometimes to the extent that certain features are not possible, such as printing on tabs or between hole punches or rejecting (or jamming) odd-shaped or odd-sized media.

SUMMARY

A method and apparatus for detecting a size and shape of media on which image data is to be printed in an image production device is disclosed. The method may include receiving a request to print a print job, scanning image data for the print job, feeding media on which the image data is to be printed, scanning the fed media to determine the size and shape of the fed media, generating a mask based on the determined size and shape of the fed media, applying the mask to the image data, the mask permitting marking material to be applied to an intermediate member based on the determined size and shape of the fed media, applying the image data to the fed media; and outputting the fed media containing the image data.

BRIEF DESCRIPTION OF THE DRAWINGS

FIGS. 5A-5D are diagrams illustrating the exemplary image data processing process in accordance with one possible embodiment of the disclosure.

DETAILED DESCRIPTION

Figure 1:
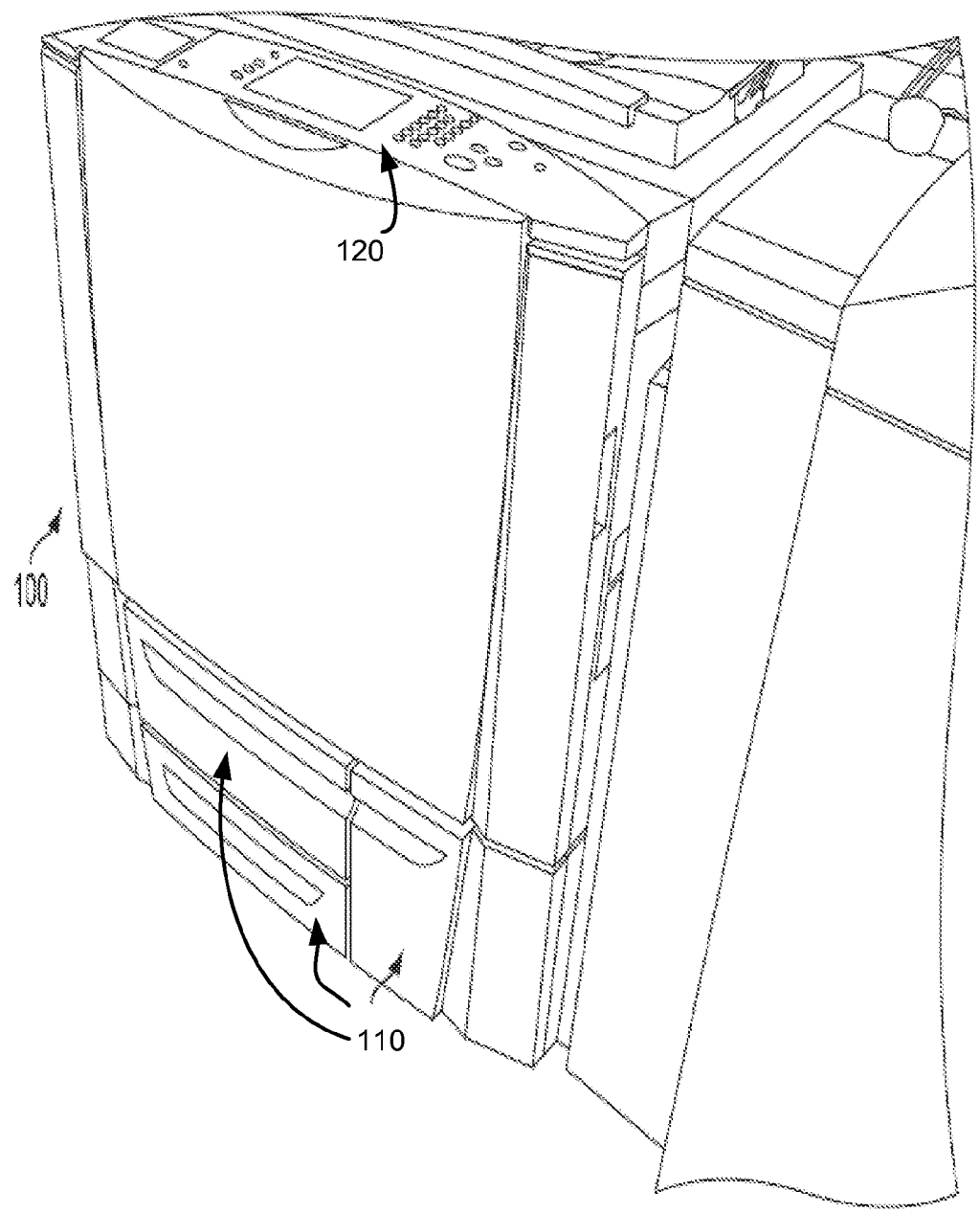
FIG. 1 is an exemplary diagram of an image production device in accordance with one possible embodiment of the disclosure.

Aspects of the embodiments disclosed herein relate to a method for detecting a size and shape of media on which image data is to be printed in an image production device, as well as corresponding apparatus and computer-readable medium.

The disclosed embodiments may include a method for detecting a size and shape of media on which image data is to be printed in an image production device. The method may include receiving a request to print a print job, scanning image data for the print job, feeding media on which the image data is to be printed, scanning the fed media to determine the size and shape of the fed media, generating a mask based on the determined size and shape of the fed media, applying the mask to the image data, the mask permitting marking material to be applied to an intermediate member based on the determined size and shape of the fed media, applying the image data to the fed media; and outputting the fed media containing the image data.

The disclosed embodiments may further include an image production device that may include a scanner that scans images and converts the scanned images into image data, a scan bar that detects the size and shape of fed media, an intermediate member that places the scanned image data onto the fed media, and an image data processing unit that receives a request to print a print job, scans image data for the print job using the scanner, feeds media on which the image data is to be printed, instructs the scan bar to scan the fed media to determine the size and shape of the fed media, generates a mask based on the determined size and shape of the fed media, applies the mask to the image data, applies the image data to the fed media using the intermediate member, and outputs the fed media containing the image data, wherein the mask permits marking material to be applied to the intermediate member based on the determined size and shape of the fed media.

The disclosed embodiments may further include a computer-readable medium storing instructions for controlling a computing device for detecting a size and shape of media on which image data is to be printed in an image production device. The instructions may include receiving a request to print a print job, scanning image data for the print job, feeding media on which the image data is to be printed, scanning the fed media to determine the size and shape of the fed media, generating a mask based on the determined size and shape of the fed media, applying the mask to the image data, the mask permitting marking material to be applied to an intermediate member based on the determined size and shape of the fed media, applying the image data to the fed media; and outputting the fed media containing the image data.

The disclosed embodiments may concern detecting a size and shape of media on which image data is to be printed. In this manner, a scan bar may be placed early in the media path to enable the size, shape and location of exclusions in the media path to be determined. Once determined, an image data processing unit may determine the locations where toner is to be laid down accordingly. This approach may lead to increasing the current functionality in image production devices when printing on media with exclusions.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include one or more media tray doors 110 and a local user interface 120. The one or more media tray doors 110 may provide access to one or more media trays that contain media. The one or more media tray doors 110 may be opened by a user so that media may be checked, replaced, or to investigate a media misfeed or jam, for example.

The user interface 120 may contain one or more display screen (which may be a touchscreen or simply a display, for example), and a number of buttons, knobs, switches, etc. to be used by a user to control image production device 100 operations. The one or more display screen may also display warnings, alerts, instructions, and information to a user. While the user interface 120 may accept user inputs, another source of image data and instructions may include inputs from any number of computers to which the printer is connected via a network, for example.

Figure 2:
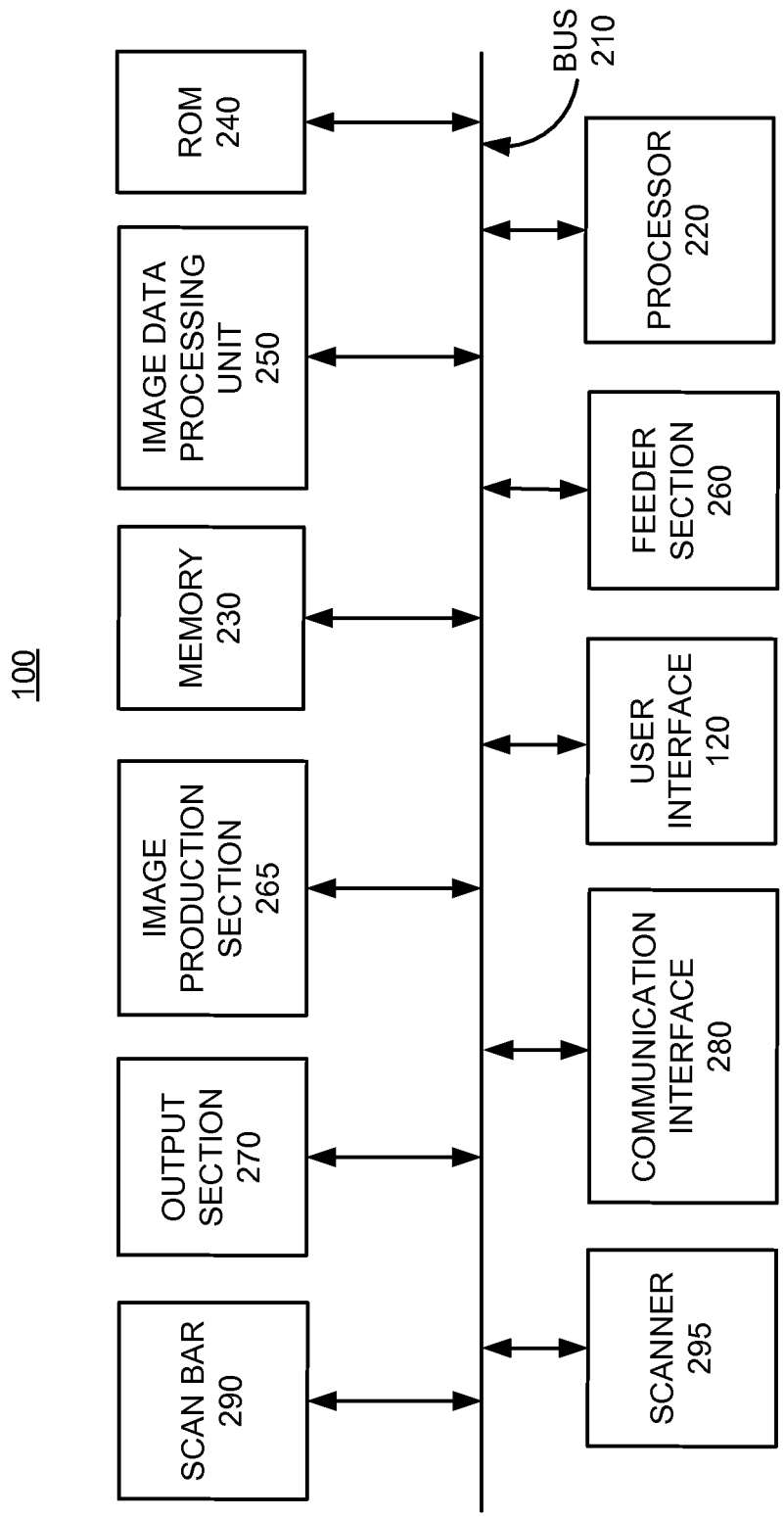
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, an image data processing unit 250, the user interface 120, a feeder section 260, an image production section 265, an output section 270, a communication interface 280, a scan bar 290, and a scanner 295. Bus 210 may permit communication among the components of the image production device 100.

The image production section 265 may include hardware by which image signals are used to create a desired image. The stand-alone feeder section 260 may store and dispense media sheets on which images are to be printed. The output section 270 may include hardware for stacking, folding, stapling, binding, etc., prints which are output from the image production section. If the image production device 100 is also operable as a copier, the image production device 100 may further includes a document feeder and scanner which may operate to convert signals from light reflected from original hard-copy image into digital signals, which are in turn processed to create copies with the image production section 265.

With reference to feeder section 260, the section may include one or more media trays, each of which stores a media stack or print sheets ("media") of a predetermined type (size, weight, color, coating, transparency, etc.) and may include a feeder to dispense one of the media sheets therein as instructed. The media trays may be accessed by a user by opening the one or more media tray doors 110. One or more media tray door sensors may sense if one or more media tray door is either open or closed. The one or more media tray door sensors may be any sensors known to one of skill in the art, such as contact, infra-red, magnetic, or light-emitting diode (LED) sensors, for example. The one or more media tray size sensors may be any sensors that may detect media size in a media known to one of skill in the art, including switches, etc.

Certain types of media may require special handling in order to be dispensed properly. For example, heavier or larger media may desirably be drawn from a media stack by use of an air knife, fluffer, vacuum grip or other application (not shown in the Figure) of air pressure toward the top sheet or sheets in a media stack. Certain types of coated media may be advantageously drawn from a media stack by the use of an application of heat, such as by a stream of hot air (not shown in the Figure). Sheets of media drawn from a media stack on a selected media tray may then be moved to the image production section 265 to receive one or more images thereon. Then, the printed sheet is then moved to output section 270, where it may be collated, stapled, folded, punched, etc., with other media sheets in manners familiar in the art.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User interface 120 may include one or more conventional mechanisms that permit a user to input information to and interact with the image production device 100, such as a keyboard, a display, a mouse, a pen, a voice recognition device, touchpad, buttons, etc., for example. Output section 270 may include one or more conventional mechanisms that output image production documents to the user, including output trays, output paths, finishing section, etc., for example. The image production section 265 may include an image printing and/or copying section, a scanner, a fuser, etc., for example.

The scan bar 290 may represent any scanning mechanism known to one of skill in the art that may be able to detect the size and shape of media on which image data is to be printed. The scanner 295 may represent any scanner that may scan images and convert the scanned images into image data, such as a document feed or flatbed scanner, for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like that are capable of displaying the print release marking and can be scanned by the image production device 100.

Figure 3:
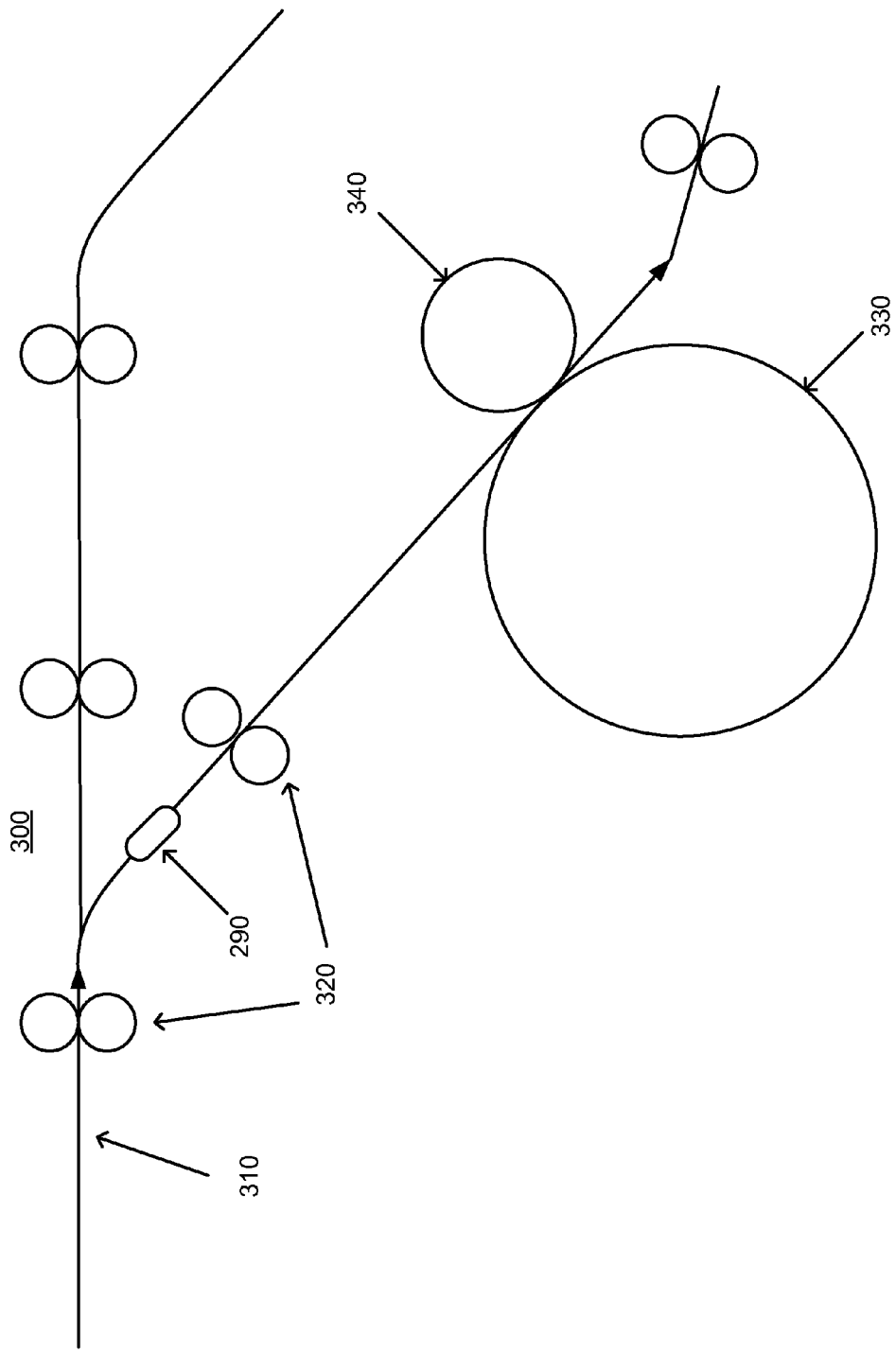
FIG. 3 is an exemplary diagram illustrating a portion of the image production section in accordance with one possible embodiment of the disclosure.

FIG. 3 is an exemplary diagram illustrating a portion 300 of the image production section 265 in accordance with one possible embodiment of the disclosure. For purposes of the disclosed embodiments, the portion 300 of the image production section 265 may include the media path 310, feeder rollers 320, an intermediate member 330, and a pressure roller 340. The feeder rollers 320 help media to be fed along the media path 310 so that image data can be placed on the media.

The intermediate member 330 may have marking material (e.g., ink, toner, etc.) placed on it in the form of the image data that the user desires to be placed on the media. In some embodiments, the pressure roller 340 may assist the intermediate member 330 in applying image data to the media. The pressure roller may be heated or unheated, for example. While intermediate member 330 is shown as a drum in FIG. 3, the intermediate member 330 in other embodiments the intermediate member 330 may be an imaging drum, a photoreceptor, a belt, a photoreceptor belt, etc.

The location of the scar bar 290 may be in the media path 310 anywhere between the feeder section 260 and the intermediate member 330. As the media is fed and is moving in the media path 310, the fed media 510 as shown in FIG. 5A, may pass under or by the scan bar 290. The fed media 510 in this example is tabbed media having a tab 520 and exclusions 530 (area where media would usually exist but does not).

The scan bar 290 may detect the size and shape of the fed media 510 so that a mask 540 as shown in FIG. 5B, may be provided before the image is place on the media 510. The mask 540 may ensure the image data 550 as shown in FIG. 5C is placed only where media 510 exists and may prevent excess marking material from being placed on the intermediate member 330 where marking material will not come in contact with the fed media 510. The result is shown as printed media 560 in FIG. 5D. Note that the process of the disclosed embodiments may allow text to be printed on the tab 520 without being blocked out or having excess marking material placed on the intermediate member 330. Note also that the process of the disclosed embodiments may be performed using any image production environment, such as solid ink, ink jet, xerography, ink spreading, etc. and the image production device may be a solid ink device, an ink jet device, xerographic device, or an ink spreading device.

The operation of components of the image data processing unit 250 and the image data processing process will be discussed in relation to the flowchart in FIG. 4.

Figure 4:
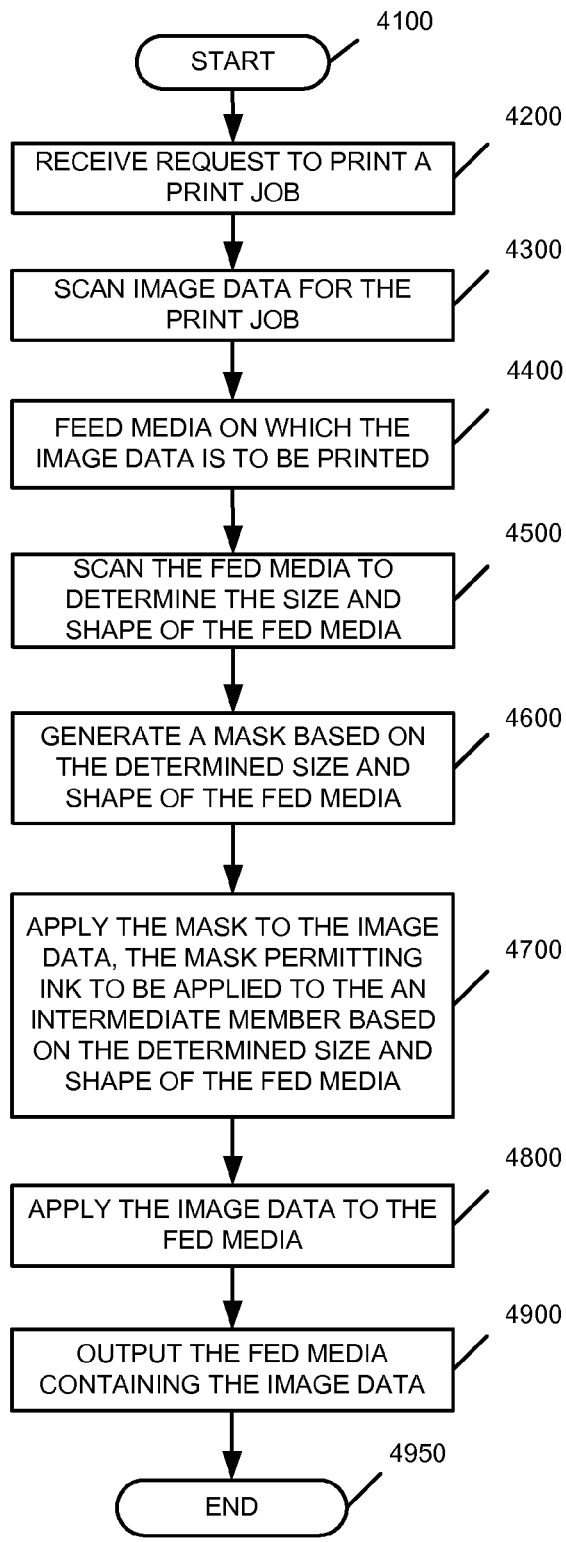
FIG. 4 is a flowchart of an exemplary image data processing process in accordance with one possible embodiment of the disclosure.

FIG. 4 is a flowchart of a larger-sized document conversion process in accordance with one possible embodiment of the disclosure. The method may begin at step 4100, and may continue to step 4200 where the image data processing unit 250 may receive a request to print a print job. At step 4300, the image data processing unit 250 may scan image data for the print job. At step 4400, the image data processing unit 250 may feed media 510 on which the image data is to be printed. The fed media 510 may have exclusions 530. As discussed above, exclusions 530 may be areas where media would usually exist but does not, such as tabbed media, hole-punched media, odd-shaped media, odd-sized media, etc.

At step 4500, the image data processing unit 250 may instruct the scan bar 290 to scan the fed media 510 to determine the size and shape of the fed media 510. At step 4600, the image data processing unit 250 may generate a mask 540 based on the determined size and shape of the fed media 510. The mask 540 may permit marking material to be applied to the intermediate member 330 based on the determined size and shape of the fed media 510. The mask 540 may prevent excess marking material from being placed on the intermediate member 330 where fed media 510 will not exist when being placed on or passes through the intermediate member 330. At step 4700, the image data processing unit 250 may apply the mask 540 to the image data 550.

At step 4800, the image data processing unit 250 may apply the image data 550 to the fed media 510. At step 4900, the image data processing unit 250 may output the fed media containing the image data 560. The process may then go to step 4950 and end.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for detecting a size and shape of media on which image data is to be printed in an image production device, comprising:

receiving a request to print a print job;

scanning image data for the print job;

feeding media on which the image data is to be printed, wherein the fed media contains exclusions;

scanning the fed media to determine the size and shape of the fed media;

generating a mask based on the determined size and shape of the fed media;

applying the mask to the image data, the mask permitting marking material to be applied to an intermediate member based on the determined size and shape of the fed media;

applying the image data to the fed media; and outputting the fed media containing the image data.

2. The method of claim 1, wherein scanning is conducted by a scan bar located in a media path prior to where the image data is applied to the fed media.

3. The method of claim 1, wherein the mask prevents excess marking material from being placed on the intermediate member where fed media will not exist when being one of placed on or passed through the intermediate member.

4. The method of claim 1, wherein the intermediate member is one of an imaging drum, a photoreceptor, a belt, and a photoreceptor belt.

5. The method of claim 1, wherein is image production device is one of solid ink device, an ink jet device, xerographic device, and an ink spreading device.

6. The method of claim 1, wherein the image production device is one of a copier, a printer, a facsimile device, and a multi-function device.

7. An image production device, comprising:
- a scanner that scans images and converts the scanned images into image data;
- a scan bar that detects the size and shape of fed media, wherein the fed media contains exclusions;
- an intermediate member that places the scanned image data onto the fed media; and
- an image data processing unit that receives a request to print a print job, scans image data for the print job using the scanner, feeds media on which the image data is to be printed, instructs the scan bar to scan the fed media to determine the size and shape of the fed media, generates a mask based on the determined size and shape of the fed media, applies the mask to the image data, applies the image data to the fed media using the intermediate member, and outputs the fed media containing the image data,
- wherein the mask permits marking material to be applied to the intermediate member based on the determined size and shape of the fed media.

8. The image production device of claim 7, wherein the scan bar is located in a media path prior to where the image data is applied to the fed media.

9. The image production device of claim 7, wherein the mask prevents excess marking material from being one of placed on the intermediate member where fed media will not exist when being placed on or passed through the intermediate member.

10. The image production device of claim 7, wherein the intermediate member is one of an imaging drum, a photoreceptor, a belt, and a photoreceptor belt.

11. The image production device of claim 7, wherein is image production device is one of solid ink device, an ink jet device, xerographic device, and an ink spreading device.

12. The image production device of claim 7, wherein the image production device is one of a copier, a printer, a facsimile device, and a multi-function device.

13. A non-transitory computer-readable medium storing instructions for controlling a computing device for detecting a size and shape of media on which image data is to be printed in an image production device, the instructions comprising:
- receiving a request to print a print job;
- scanning image data for the print job;
- feeding media on which the image data is to be printed, wherein the fed media contains exclusions;
- scanning the fed media to determine the size and shape of the fed media;
- generating a mask based on the determined size and shape of the fed media;
- applying the mask to the image data, the mask permitting marking material to be applied to the an intermediate member based on the determined size and shape of the fed media;
- applying the image data to the fed media; and
- outputting the fed media containing the image data.

14. The non-transitory computer-readable medium of claim 13, wherein scanning is conducted by a scan bar located in a media path prior to where the image data is applied to the fed media.

15. The non-transitory computer-readable medium of claim 13, wherein the mask prevents excess marking material from being placed on the intermediate member where fed media will not exist when being placed on or passed through the intermediate member.

16. The non-transitory computer-readable medium of claim 13, wherein the intermediate member is one of an imaging drum, a photoreceptor, a belt, and a photoreceptor belt.

17. The non-transitory computer-readable medium of claim 13, wherein is image production device is one of solid ink device, an ink jet device, xerographic device, and an ink spreading device.

18. The non-transitory computer-readable medium of claim 13, wherein the image production device is one of a copier, a printer, a facsimile device, and a multi-function device.

* * * * *